(12) United States Patent
Morey

(10) Patent No.: US 10,390,499 B2
(45) Date of Patent: Aug. 27, 2019

(54) MAPLE TAP WITH SLEEVE

(71) Applicant: Dennis Morey, Milton, VT (US)

(72) Inventor: Dennis Morey, Milton, VT (US)

( * ) Notice: Subject to any disclaimer, the term of this patent is extended or adjusted under 35 U.S.C. 154(b) by 164 days.

(21) Appl. No.: 15/371,157

(22) Filed: Dec. 6, 2016

(65) Prior Publication Data

US 2018/0153110 A1 Jun. 7, 2018
US 2018/0255718 A9 Sep. 13, 2018

Related U.S. Application Data

(60) Provisional application No. 62/263,918, filed on Dec. 7, 2015.

(51) Int. Cl.
*A01G 23/14* (2006.01)
(52) U.S. Cl.
CPC ................... *A01G 23/14* (2013.01)
(58) Field of Classification Search
CPC ............................... A01G 23/10; A01G 23/14
USPC ............................................... 47/52
See application file for complete search history.

(56) References Cited

U.S. PATENT DOCUMENTS

| | | | |
|---|---|---|---|
| 2,877,601 A * | 3/1959 | Griggs | A01G 23/10 47/52 |
| 4,887,387 A * | 12/1989 | Lesquir | A01G 23/14 47/52 |
| 2005/0000153 A1* | 1/2005 | White | A01G 23/14 47/11 |
| 2011/0173881 A1* | 7/2011 | Perkins | A01G 23/14 47/52 |
| 2013/0318868 A1* | 12/2013 | Leger | A01G 23/10 47/52 |
| 2016/0165816 A1* | 6/2016 | Desorcy | A01G 23/14 47/52 |

FOREIGN PATENT DOCUMENTS

| | | | | |
|---|---|---|---|---|
| CA | 2260495 A1 * | 7/2000 | | A01G 23/14 |
| CA | 2271262 A1 * | 11/2000 | | A01G 23/10 |
| CA | 2418298 A1 * | 8/2004 | | A01G 23/14 |
| CA | 2681732 A1 * | 12/2009 | | A01G 23/14 |
| CA | 2658916 A1 * | 9/2010 | | A01G 23/14 |

OTHER PUBLICATIONS

English-language translation of CA 2681732 (Year: 2009).*
English-language translation of CA 2418298 (Year: 2004).*

* cited by examiner

*Primary Examiner* — Lisa L Tsang
(74) *Attorney, Agent, or Firm* — Green Mountain Innovations LLC; Alan Coté

(57) ABSTRACT

A device for maple sap harvesting, which includes an assembly of a tubular sleeve which is removably mounted inside a tubular section of a tap. The tubular sleeve may be molded from a food-grade, anti-bacterial material. The tubular sleeve is inserted into the tap before the tap is driven into a maple tree. When the tap is removed from the tree at the conclusion of the sap harvest period, the sleeve may be discarded. The next season, a new sleeve is placed in the tap, with the new sleeve containing no residual bacterial contamination from the previous season of use.

10 Claims, 3 Drawing Sheets

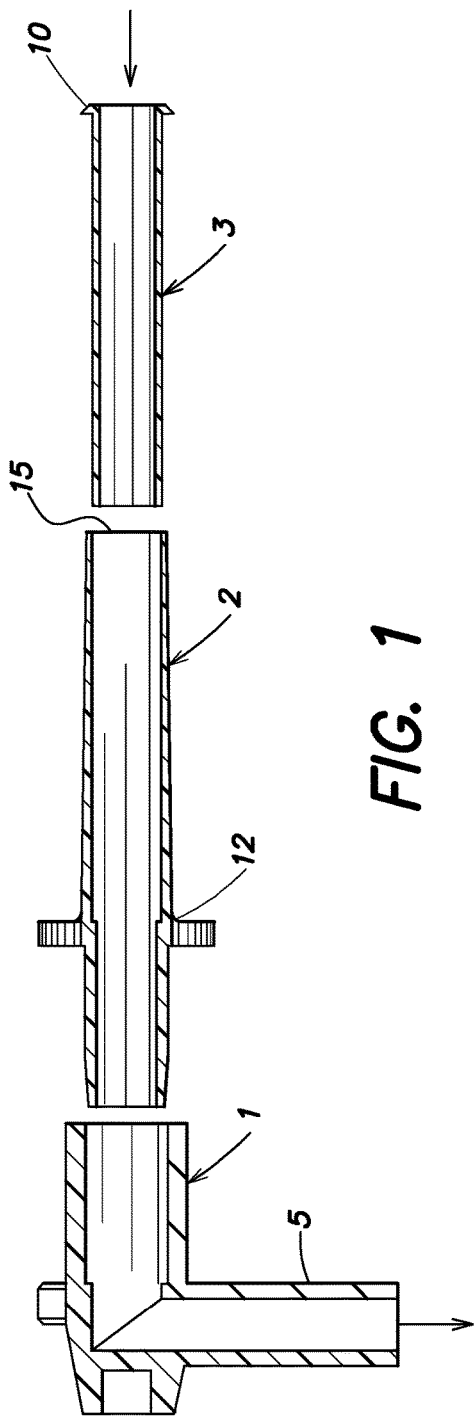
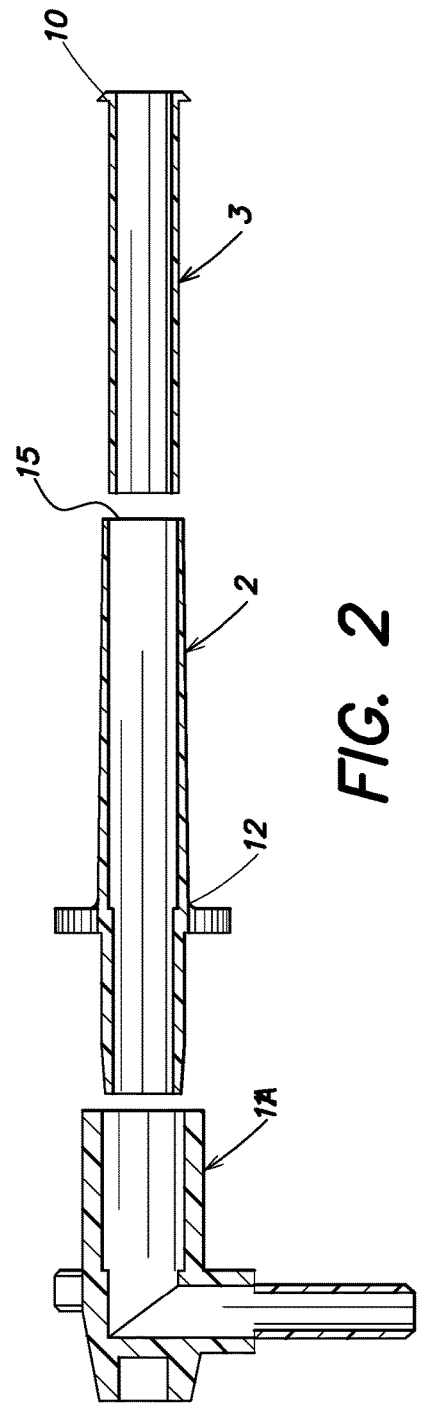

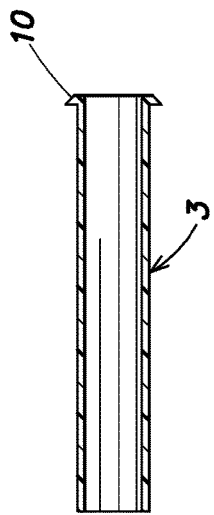
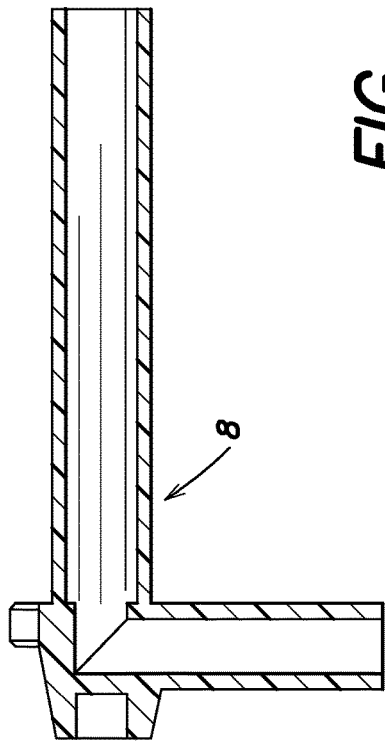
FIG. 3
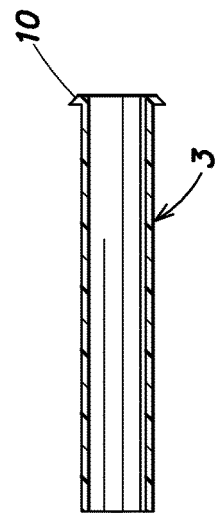
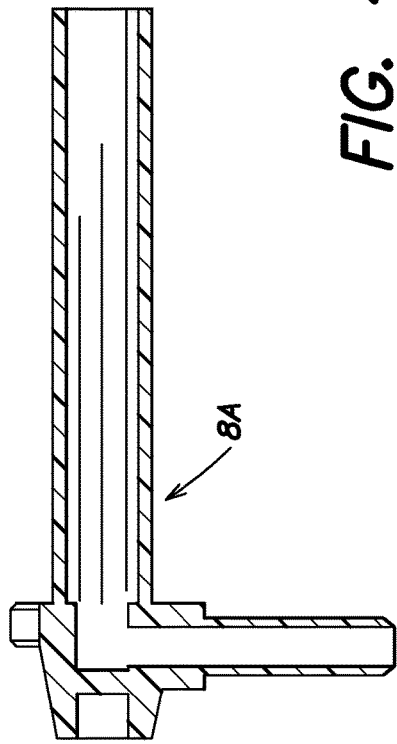
FIG. 4

MAPLE TAP WITH SLEEVE

CROSS-REFERENCE TO RELATED APPLICATION

This application claims the benefit of U.S. Provisional Application No. 62/263,918, filed Dec. 7, 2015

FEDERALLY-SPONSORED RESEARCH

None

BACKGROUND

The present disclosure relates to the field of tapping devices as used in the harvest of sap from maple trees. Current systems for the collection of sap from maple trees include plastic taps connected to plastic tubing, or lines. The tap is pressed into a hole that is drilled into the tree trunk, with maple sap flowing through the inner diameter of the tap. The lines are routed to a collection tank, which typically receives multiple lines from different trees. The system of lines may be configured in a branch and trunk manner, with smaller lines from taps joining larger lines, with the larger lines routing to a tank.

A vacuum system may also be included, which creates negative pressure in the lines and may increase the flow of sap from a tree. Natural vacuum systems rely on the slope of the collection lines to creature negative pressure, while artificial vacuum systems employ a vacuum pump.

Taps are typically installed to maple trees during winter months, before sap begins flowing. The procedure typically involves boring a hole in the tree trunk, and inserting a tap into the hole. The tap may need to be driven into the hole with a mallet. A collection line is then attached to the tap. At the end of the sugaring season, each tap is typically removed from the tree. Taps are typically molded from plastics such as nylon or polycarbonate.

The build-up of bacteria inside the tap is a significant problem, as bacteria build-up greatly reduces sap flow rates, as confirmed by a number of scientifically-rigorous studies. One study showed that 40.2% of sap yields can be explained by spout/adaptor age, with an average loss of 7.3 gallons per tap. Reusing taps causes a significant reduction in sap yields. The same study showed that aged lines have much less of an effect on saps yields than do aged taps. Taps that include a check valve also showed significant reduction in sap yields from year-to-year, with additional studies showing similar results.

One practice is to clean the inside of each tap, for example with a brush and cleaning fluid, prior to installing the tap in a tree. In addition to being laborious, cleaning has also been found to be at least somewhat ineffective at removing bacteria build-up inside a tap. Disposing of a tap after a single season of use avoids the problem of bacteria build-up, but is of course both wasteful and costly.

Additionally, there is evidence that a smaller inner diameter for a tap or tubing may increase sap yields, by improving the natural vacuum effect of the system. Additionally, there is evidence that the tap material that sap flows through has an effect on sap yields. That is, tap materials with different coefficients of friction and other properties may produce different sap yields.

BRIEF SUMMARY

Disclosed is a device for maple sap harvesting, which includes an assembly of a tubular sleeve which is removably mounted inside a tubular section of a tap. The tubular sleeve may be molded from a food-grade, anti-bacterial material. The tubular sleeve is inserted into the tap before the tap is driven into a maple tree. At the end of the season, when the tap is removed, the sleeve may be discarded. The next season, a new sleeve is placed in the tap, with no residual bacterial contamination from the previous season of use.

BRIEF DESCRIPTION OF THE FIGURES

FIG. 1 shows a first embodiment of the present system
FIG. 2 shows a second embodiment of the present system
FIG. 3 shows a third embodiment of the present system
FIG. 4 shows a fourth embodiment of the present system

DETAILED DESCRIPTION

Figure 5:
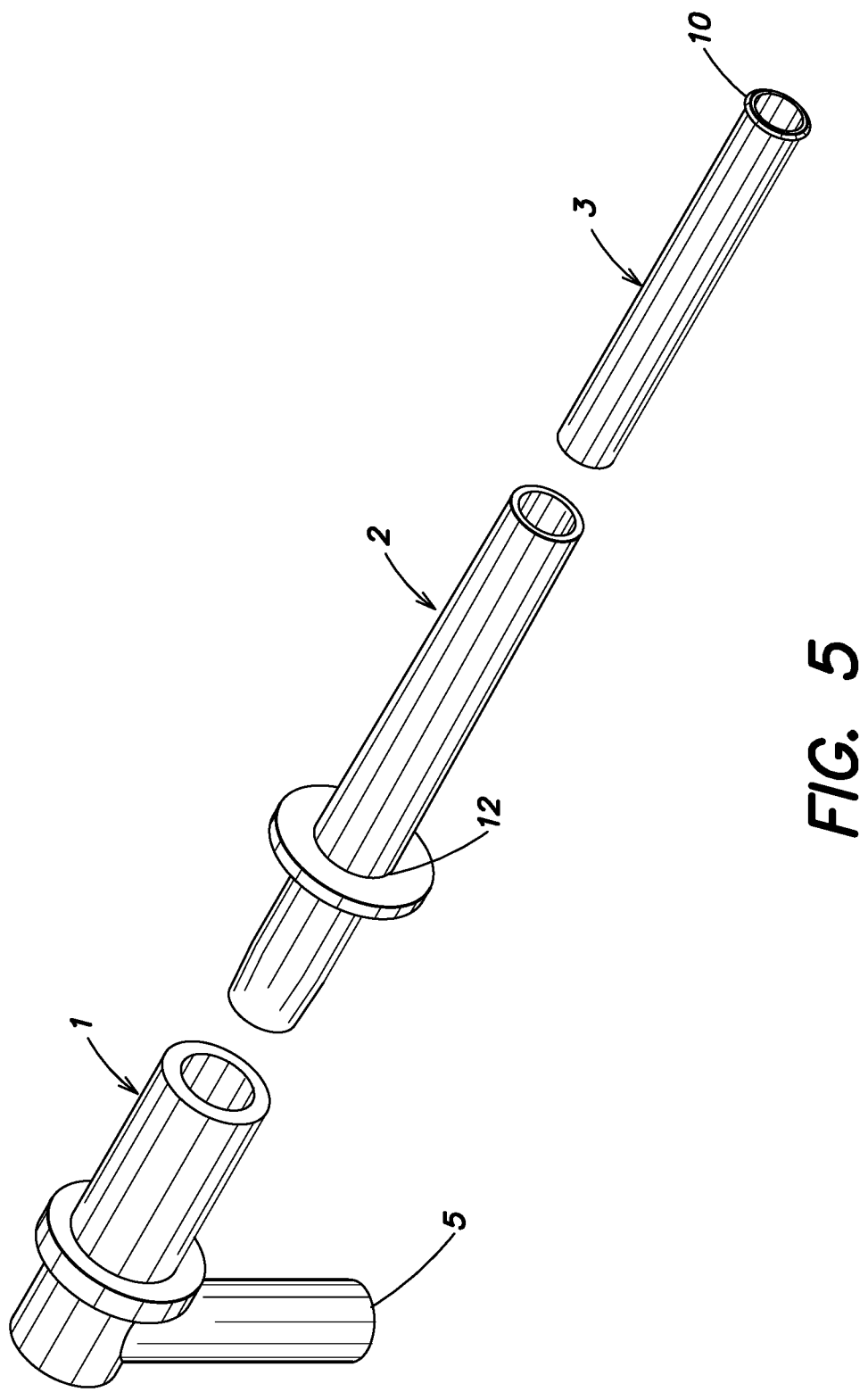

As shown in FIG. 1, the design includes a sleeve in conjunction with a tap and/or tap extension. Sleeve 3 slides into tap 2, with tap 2 in female configuration and sleeve 3 in a male configuration. Both are tubular in cross section. Thus, tubular sleeve 3 mounts into the tubular section of tap 2, together forming an assembly. Spout 1 then slides on to tap 3, with tubing (not shown) attached to spout 1 at 5, with the sap flowing in the direction of the arrows.

FIG. 2 shows an embodiment using identical components 2 and 3, but 1A is configured to attach different diameter tubing than that shown in FIG. 1. FIGS. 3 and 4 show additional variations. The embodiment shown in FIG. 3 uses a one-piece tap and spout piece 8, or combination tap 8, with sleeve 3 fitting directly into combination piece 8. FIG. 4 shows an additional embodiment configured to attach to different diameter tubing than that shown in FIG. 3.

In all cases, sleeve 3 preferably includes flange 10. In FIG. 1, when sleeve 3 is fully inserted into tap 2, flange 10 abuts end 15 of tap 2, with the left-end of sleeve 3 (as shown) abutting neck 12 of tap 2.

Known prior art shows arrangements of taps and lines, but lack a sleeve such as sleeve 3. Sleeve 3 provides numerous benefits, as will be explained. Each year, new holes are drilled in the tree, and the spout is then driven into the tree. The entire extension and spout is removed from the tree at the end of each sap season. The pieces are then either discarded, or the tap's sap passageway is cleaned to remove bacteria build-up that accumulates during the sap flow process. Therefore, one benefit of the present system is that the small, inexpensive sleeve may be discarded, but the entire tap may be re-used.

The clearance between the tap and the hole in a tree is tight enough such that the spout and/or extension must be driven into the tree, typically with a mallet. Thus, the spout/extension material must be strong enough to withstand hammering without being damaged. This limits the choice of plastic materials that may be used for a tap and/or spout. Typically, taps are made of nylon or polycarbonate to maintain sufficient strength. With the present system, sleeve 3 is not limited to materials that must withstand the force of be hammered into a tree. Thus, sleeve may be made of types of plastic which may be softer and smoother than that of the spout/extension, but that have desirable traits such as a greater resistance to bacteria growth, and/or a more "slippery" surface. Such traits reduce bacteria growth during the sap flowing season, and thus may increase sap yields. Examples of suitable materials for sleeve 3 include but are not limited to high-density polyethylene (HDPE). Further, anti-bacterial additives may be includes in the HDPE material.

The inner diameter of sleeve 3 is smaller than that of the inner diameter of a typical tap. Therefore, sleeve 3's smaller diameter may increase sap yields, by improving the natural vacuum effect of the system.

The dimensions of the sleeve system as shown by 3 may be configured to a new, dedicated tap, or may be configured to be compatible with any existing taps.

Although the present system has been described with respect to one or more embodiments, it will be understood that other embodiments of the present system may be made without departing from the spirit and scope of the present system. Hence, the present system is deemed limited only by claims and the reasonable interpretation thereof.

What is claimed:

1. A device for maple sap harvesting, comprising:
   a tap with a tubular cross-section and molded of a single material;
   a first portion of the tap configured to attach to a collection line;
   a tubular sleeve with a first end and a second end, the sleeve configured to removably mount inside a second portion of the tap;
   a flange on the first end of the sleeve, the flange abutting an end of the second portion of the tap when the second end of the sleeve is fully inserted into the tap, wherein a direction of insertion of the sleeve into the tap is into an inner opening of the second portion of the tap; wherein the tap includes a neck, the neck formed by a continuous interior surface of the tap having a first diameter followed by a second smaller diameter, with the second end of the sleeve abutting the neck when the sleeve is fully inserted into the tap, and the neck acting as a stop for the sleeve.

2. The device of claim 1, in which the tubular sleeve and the tap are made of different materials.

3. The device of claim 1, in which the tubular sleeve is made from high-density polyethylene.

4. The device of claim 1, in which a material of the tubular sleeve includes an anti-bacterial additive.

5. The device of claim 1, in which the tap includes a bend of 90 degrees.

6. A device for maple sap harvesting, comprising:
   a tubular sleeve configured to removably mount inside a one-piece tubular tap molded of a single material;
   the sleeve having a first end and a second end;
   the tap having a first portion with an inner opening and a second portion with an inner opening;
   a flange on the first end of the sleeve, the flange abutting an end of the second portion of the tap when the second end of the sleeve is fully inserted into the tap, wherein the sleeve's direction of insertion into the tap is into an end of the inner opening of the second portion of the tap; wherein the tap includes a neck, the neck formed by a continuous interior surface of the tap having a first diameter followed by a second smaller diameter, with the second end of the sleeve abutting the neck when the sleeve is fully inserted into the tap, and the neck acting as a stop for the sleeve.

7. The device of claim 6, in which the tubular sleeve is made from high-density polyethylene.

8. The device of claim 6, in which a material of the tubular sleeve includes an anti-bacterial additive.

9. The device of claim 6, in which a first portion of the tap is configured to attach to a spout, and the spout is configured to attach to a collection line.

10. The device of claim 6, in which a first portion of the tap is configured to attach to a collection line.

* * * * *